US010644959B2

(12) United States Patent
Bharti et al.

(10) Patent No.: US 10,644,959 B2
(45) Date of Patent: May 5, 2020

(54) METHOD AND FRAMEWORK FOR PROTOCOL TO OPTIMIZE EDGE SIDE DYNAMIC RESPONSE SYSTEM WITH CONTEXT PROPAGATION FOR IOT

(71) Applicant: International Business Machines Corporation, Armonk, NY (US)

(72) Inventors: Harish Bharti, Pune (IN); Abhay K. Patra, Pune (IN); Rajesh K. Saxena, Mumbai (IN); Rakesh R. Shinde, Pune (IN)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 15/415,520

(22) Filed: Jan. 25, 2017

(65) Prior Publication Data

US 2018/0212833 A1    Jul. 26, 2018

(51) Int. Cl.
*H04L 29/06* (2006.01)
*H04L 12/24* (2006.01)

(52) U.S. Cl.
CPC .......... *H04L 41/12* (2013.01); *H04L 63/0428* (2013.01)

(58) Field of Classification Search
None
See application file for complete search history.

(56) References Cited

U.S. PATENT DOCUMENTS

| 8,443,436 | B1 | 5/2013 | Sankruthi | |
| 9,165,144 | B1 | 10/2015 | Goldstein et al. | |
| 9,355,368 | B2 | 5/2016 | Djugash | |
| 9,967,330 | B2* | 5/2018 | Quinn | H04L 67/1014 |
| 2010/0077435 | A1 | 3/2010 | Kandekar et al. | |
| 2014/0244710 | A1* | 8/2014 | Sharma | H04L 67/12 709/201 |
| 2014/0337850 | A1* | 11/2014 | Iniguez | G06F 9/4843 718/102 |
| 2015/0067154 | A1 | 3/2015 | Ly et al. | |
| 2015/0163289 | A1* | 6/2015 | Paul | H04L 67/02 709/201 |
| 2017/0005874 | A1* | 1/2017 | Banerjee | H04L 67/125 |
| 2017/0070890 | A1* | 3/2017 | Luff | H04W 4/70 |
| 2017/0111373 | A1* | 4/2017 | Morton | H04L 63/126 |
| 2018/0006961 | A1* | 1/2018 | Guibene | H04W 4/70 |
| 2018/0048710 | A1* | 2/2018 | Altin | H04W 76/10 |
| 2018/0116004 | A1* | 4/2018 | Britt | H04W 40/125 |

OTHER PUBLICATIONS

Internet of Things—Developing and Testing Smart Embedded Devices; Web link: http://in.mathworks.com/solutions/internet-of-things/developing-and-testing-edge-node-devices-for-your-iot-system.html; 3 pages; printed Jan. 19, 2017.

\* cited by examiner

*Primary Examiner* — Shin-Hon (Eric) Chen
(74) *Attorney, Agent, or Firm* — Aaron N. Pontikos

(57) ABSTRACT

The present invention is a method and framework for protocol to optimize edge side dynamic response system with context propagation for IoT. The protocol is a composition of a set of predefined routines, called 'parlance', that control the lifecycle of the meshed devices. The master has characteristics to store database as block chains, encryption using hash function, run defined duty cycles. The edge devices have characteristics to receive parlance, execute parlance, provide data to mantles.

20 Claims, 7 Drawing Sheets

| Key steps | Computation logic | Key Operation |
|---|---|---|
| Key Generation | $n = p.q$<br>$d.e \equiv 1 \bmod (p-1)(q-1)$ | N=encryption factor |
| Encryption | $c = m^e \bmod n$ | Public Key (n,e) |
| Decryption | $M = c^d \bmod n = m^{de} \bmod n$ | Private Key (d) |

Fig. 7

METHOD AND FRAMEWORK FOR PROTOCOL TO OPTIMIZE EDGE SIDE DYNAMIC RESPONSE SYSTEM WITH CONTEXT PROPAGATION FOR IOT

BACKGROUND

The present invention relates generally to a system and method for protocol for dynamic response in an IoT network, and more particularly to a method and system for protocol to optimize edge side dynamic response with context propagation for an IoT network.

The "Internet of Things" (IoT) extends the concept of Smarter Planet and Connected Things where anything that is network-enabled can be connected for biodirectional communication and utilized for solving real-time problems of the world. However, it is also essential to understand that is practically infeasible for all the IoT devices to possess significant computing, networking, and storage capabilities to leverage traditional IPv6 type of internet protocol or processing capability of a next generation processor.

For high performance and least latency use, it is essential that the events are responded to through local coordination and execution by the IoT on the edge devices rather than depending on the centralized Super Agents or IoT servers to orchestrate and manage the dynamic responses. The essence of the dynamic responses to these events is lost if everything is relayed to centralized Super Agents or IoT servers for orchestration and execution. To effectively manage the needs of such dynamic responses, it is very much imperative that the protocol implementing the orchestrations and executions should be highly efficient to work in a constrained computing and flexible network environment.

There are no comprehensive methods and framework to define an efficient protocol that implements execution and orchestrates an edge side dynamic response system in a context aware manner leveraging local IoT enabled and heterogeneous devices providing overlapping and disparate capabilities. Realizing this capability will enable timely and effective processing of high performance and low latency events, especially where time is of essence, and tapping unutilized compute capacity of IoT device as well.

Most conventional solutions focus on generic event management and contextual actions by IoT devices. The conventional solutions do not provide solutions for the need of dynamic responses to be provided by the IoT devices on the edge for real-time scenarios that demand high performance and speed without depending on the centralized Super Agents, IoT Servers, or network. There is no method and framework available that supports an efficient protocol that implements the orchestration and execution of dynamic responses within contextually local heterogeneous on-the-edge IoT networks to high performance and low latency events (that lose their essence very quickly if not acted upon). Protocols used in existing solutions are not very efficient to edge IoT networks to enable significant communication over edge-to-edge devices keeping constraints of edge devices in the context.

Therefore, there still exists a need for a system and method to define an efficient protocol that implements execution and orchestrates an edge-side dynamic response system in a context-aware manner leveraging local IoT-enabled and heterogeneous devices providing overlapping and disparate capabilities. Providing a solution to such a need will enable timely and effective processing of high performance and low latency events, especially in time-sensitive situations, and tapping unutilized compute capacity of IoT devices as well.

SUMMARY

It is an object of the present invention to provide a protocol that enables an optimized and efficient dirMantle IoT Star Topology network for generating dynamic responses for high performance and low latency events within contextually local heterogeneous IoT on-the-networks by limiting it in severe constraints so that the thin edge devices do not exceed their power, bandwidth and bit rating.

It is another object of the present invention to provide a distributed database ("hlekkr") that records every action and data, giving the network the fluidity to change its participants, masters and topology at any time, thereby imparting mobility or providing dimensionality to the network design. DirMantle stores all the activities, data, keys, mantles, parlance in block chains called "hlekkr," with each unit called "blok." At any time, it provides ability to retrieve complete audit of events for an objective from latest master.

It is a further object of the present invention to store the unconfirmed actions the masters receive in a database called the "mempool." Once a master receives a new blok, or commits/appends a blok itself, the mempool is updated, removing all actions included in the blok.

It is yet another object of the present invention to provide a set of configurable methods called parlance in the protocol dirMantle that ensures synchronicity and homogeneity to all participants of the network, and also enables communication from one edge IoT network to another edge IoT network along with transferring context and control to master on next edge Iot Network.

It is another object of the present invention to provide an optimized duty cycle 'mantle' for master, edge devices, hlekkr and "lase," defined for dynamic responses as supported by the dirMantle protocol. The "lase" is the key used to secure the data and is controlled in the hash functions.

The present invention is a system for optimizing edge side dynamic response with context propagation for IoT, comprising one or more devices. Each device is connected to a master in an IoT star topology network. The system further comprises one or more actions to be confirmed by the master and one or more bloks, each comprising one or more confirmed actions. The master transmits one or more bloks to the one or more devices in the IoT star topology network.

In an alternative embodiment, the present invention is a method for protocol to optimize edge side dynamic response system with context propagation for IoT. The method includes providing a network with a first system having one or more devices connected to a first master in an IoT star topology network; adding a second system having one or more devices connected to a second master in an IoT star topology network; receiving, by the second master, a copy of a distributed database comprising actions from the first master; validating, by the second master, the distributed database using hash functions; transmitting a blok from the first master to the second master; validating, by the second master, the blok using hash functions; and updating the distributed database and a memory database with activity information contained within the blok. The protocol is composition of the set of predefined routines, called 'parlance', that control the lifecycle of the meshed devices. The master has characteristics to store a database as block chains, execute encryption using hash function and run defined duty cycles. The edges have characteristics to receive parlance, execute parlance and provide data to mantles.

In another embodiment, the method for protocol to optimize edge side dynamic response system with context propagation for IoT includes the steps of (i) providing a network with a first system having one or more devices connected to a first master in an IoT star topology network; (ii) adding a second system having one or more devices connected to a second master in an IoT star topology network; (iii) receiving, by the second master, a copy of a distributed database comprising actions from the first master; (iv) validating, by the second master, the distributed database using hash functions; (v) transmitting a blok from the first master to the second master; (vi) validating, by the second master, the blok using hash functions; and (vii) updating the distributed database and a memory database with activity information contained within the blok. As with the previously described embodiment, the protocol is a composition of the set of predefined routines, called 'parlance', that control the lifecycle of the meshed devices. The master has characteristics to store a database as block chains, execute encryption using hash function and run defined duty cycles. The edges have characteristics to receive parlance, execute parlance and provide data to mantles.

BRIEF DESCRIPTION OF THE DRAWINGS

The present invention will be more fully understood and appreciated by reading the following Detailed Description in conjunction with the accompanying drawings, in which:

FIG. 7 is a block diagram depicting the three main steps to LASE encryption.

DETAILED DESCRIPTION

Figure 1:
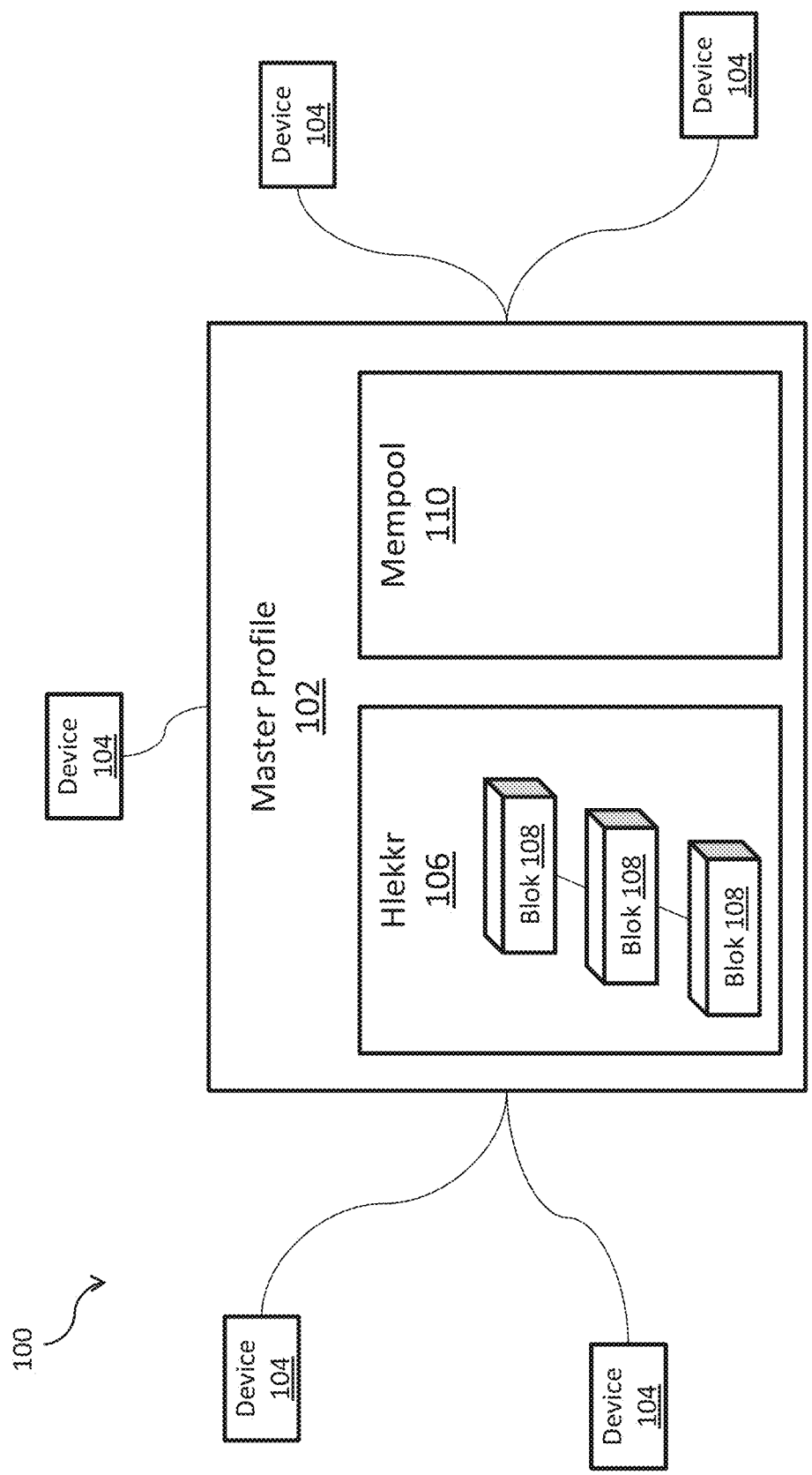
FIG. 1 is a first conceptual diagram of a non-limiting illustrative embodiment of a system for optimizing edge side dynamic response with context propagation for IoT.

Referring to the Figures, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring again to the drawings, wherein like reference numerals refer to like parts throughout, there is seen in FIG. 1, a conceptual diagrams of a non-limiting illustrative embodiment of the system that implements execution and orchestrates an edge-side dynamic response system in a context-aware manner leveraging local IoT-enabled and heterogeneous devices. As shown in FIG. 1, the system is a protocol to implement and support edge IoT devices in heterogeneous IoT networks. The protocol is an objective protocol, dirMantle, which uses the IoT to define a group which forms a dynamic start topology. The start topology has a "master" profile 102 in the middle and other devices configured as "edge" devices 104 connected to the master profile 102. The protocol is a composition of "parlance," a set of predefined routines that control the lifecycle of the meshed devices. The protocol has sessions, which are managed using "mantles," duty cycles by the master profile. The mantles are used, for example, to create a topology, take control, provide overrule instruction set, and collect data. The mantles can also send specific call-to-actions to devices, pass objective context to new masters, dismantle the topology, and release devices.

The master profiles 102 represent computers which are connected to the network implementing the dirMantle protocol. The dirMantle network is an IoT on edge network where all masters profiles 102 are heterogeneous. The master profiles 102 can store databases as block chains, perform encryption using the hash function, and run defined duty cycles. Meanwhile, the edge devices 104 receive and execute parlance, and provide data to mantles. The key used to secure the data is a "lase" controlled in the hash functions. DirMantle stores all the activities, data, keys, mantles, and parlance in block chains. The block chains are termed "hlekkr," 106 while each unit is a "blok" 108.

Driving Actions in the DirMantle

Figure 2:
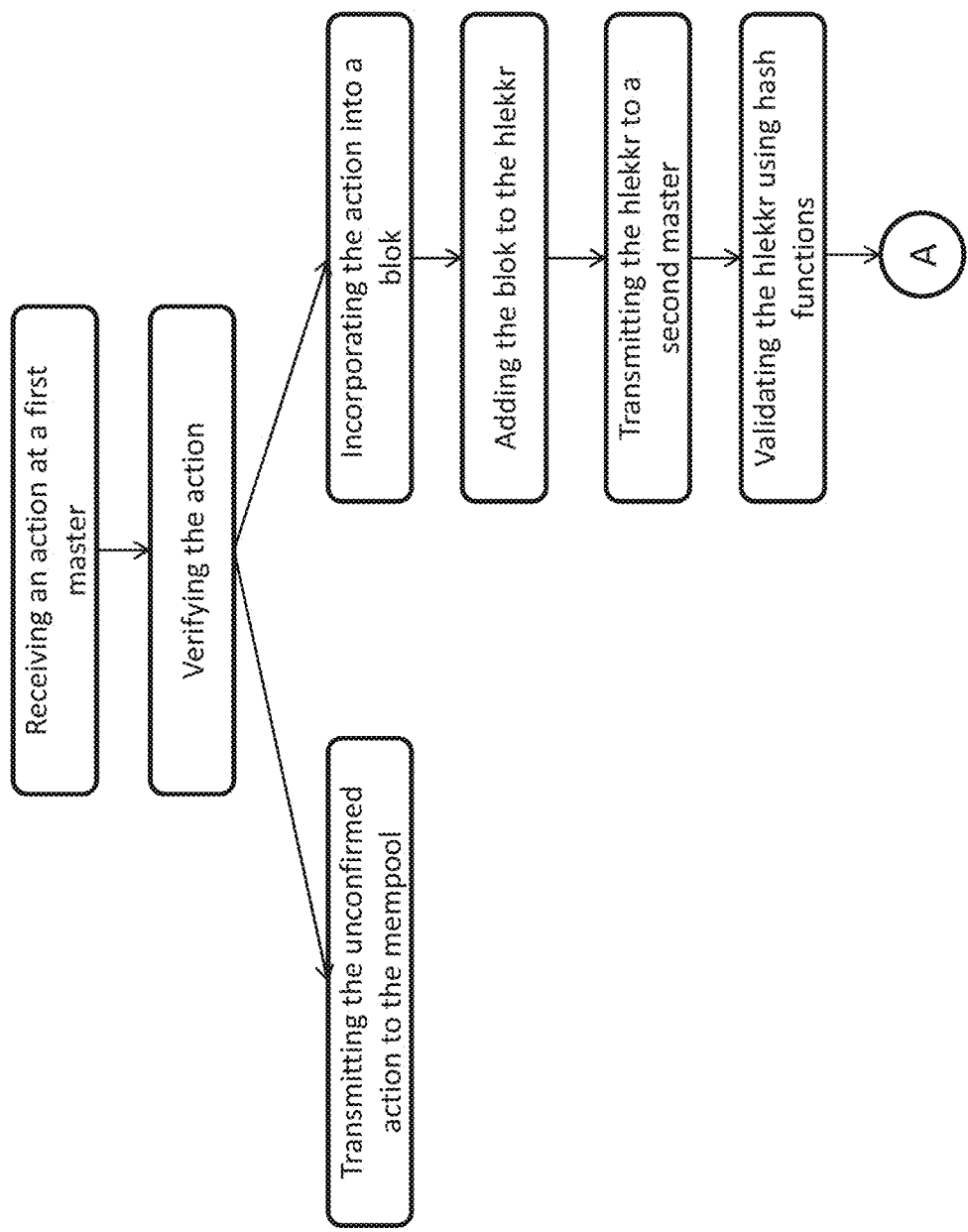
FIG. 2 is a flowchart of a non-limiting illustrative embodiment of a method for optimizing edge side dynamic response with context propagation for IoT.
Figure 3:
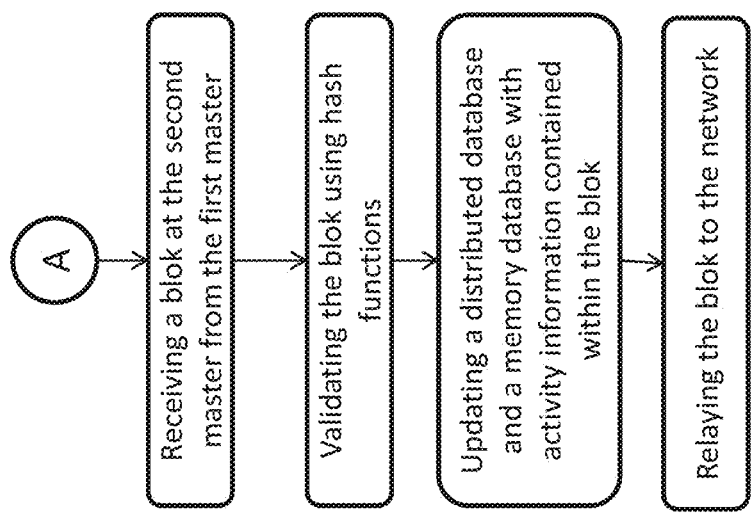
FIG. 3 is another flowchart of a non-limiting illustrative embodiment of a method for optimizing edge side dynamic response with context propagation for IoT.

Referring now to FIGS. 2 and 3, there are shown flowcharts of a non-limiting illustrative embodiment of a method for optimizing edge side dynamic response with context propagation for IoT. As described above, the dirMantle network is comprised of masters, each master connected to edge devices. Each master transmits a set of instruction parlance to each of its edge devices. The edge devices then execute the parlance and provide data to the mantles. When an action is created, it is relayed to the dirMantle network through masters. A newly created action that has not been incorporated into any blok is an unconfirmed action. Therefore, an action that is included in a blok is said to be confirmed. Before an action is included in a blok, the master checks the new action for validity and determines whether the new action is a duplicate of an action already in a database termed the "mempool." Actions are valid and not duplicative are related to a blok and confirmed. If the network is under heavy usage and there are many unconfirmed actions, it can take several bloks for a particular action to be included in a blok.

Masters may receive actions and bloks from other masters, and relay these actions and bloks to other masters. However, each master keeps a full copy of the hlekkr, which maintains a secure list of all the actions. The hlekkr uses proof-of-work to secure the distributed database. Actions that are unconfirmed are stored by the master in the mempool. Once a master receives a new blok, or commits or appends a blok to itself, the mempool is updated, removing all actions included in the blok.

Thus, the master has additional data structures, such as the mempool, so that it can quickly validate newly received actions and committed or appended bloks. If the received action or blok is valid, the master updates its data structures and relays it to the connected masters in the network. However, the master does not need to trust other masters because it validates independently from all the information it receives from them. All receiving masters first check the validity of the blok received. To check the validity, the master determines if the blok can solve the partial hash inversion problem with the required difficulty. The master then updates its internal data structures to reflect the new information contained in the blok. The propagation of a blok in the network is delayed by the usual network delays, but also because each master checks the full validity of a blok before relaying it. Propagation delay is proportional to the size of the blok, so large bloks can take considerable time to propagate.

Masters provide services to edge devices by performing tasks on behalf of the edge devices, such as relaying to the network the actions created by the edge devices and keeping track of the confirmation status of an action, for example.

Tracking confirmation status may include notifying the edge device when an action has been included in a blok and when new bloks have been added on top of the blok where the action was included. Masters cannot change actions. They can only decide whether to include the actions in the blok that they are currently appending and whether to relay the actions to the rest of the network. The contents of the actions are secured by public key cryptography and cannot be changed by the master processing the action. The protocol is described in the Table 1 below.

TABLE 1

| Mantle sequence count | Master | Edge | Hlekkr | Lase | Explanation |
|---|---|---|---|---|---|
| O | Change objective context | | | | This is where the master is discovered and passed the Hlekker |
| M | Active master rule | | | | Master starts a new header blok |
| 1 | Run config | | | | Sends configuration setting including the parlance for implementing dirMantle to all the edge devices in the star |
| 1A | | Run config | | | All edge devices run the configuration and implement dirMantle by accepting the Parlance |
| 1B | | Edit blok to hlekkr | | | The configuration of the edge devices is confirmed as actions in the mempool and are made ready to be appended to the blok |
| 1C | | | Encrypt | | The Hlekkr appends the block by solving partial hash inversion problem. |
| 1D | | | Commit Hlekkr | | Blok is appended and committed to Hlekkr. |
| 2 | Receive hlekkr | | | | Master solves the partial hash inversion to receive an updated hlekkr |
| 3 | Activate Lase | | | | The Lase is activated as the key needed to decrypt the database. |
| 3A | | | | Active | Lase is now active. |
| 4 | Create topology | | | | Master creates the star topology. |
| 4a | | Registered edges are meshed | | | The registered edge devices run the parlance and are now 'meshed' to perform dirMantle functions. |
| 5 | Invoke override | | | | Master calls the stack function of overriding the individual control of the dge devices. |
| 6 | Take control | | | | The Master thus takes control of all the participating meshed edge devices |
| 6A | | Provide (control) | | | The edge devices relinquish and pass control to the master |
| 7 | Send wait | | | | Master would (optionally) send wait if the objective context does not anticipate edge device(s) to not participate for now. |
| 8 | Ask (data) | | | | Master collects the data from the edge devices |
| 8A | | Provide (data) | | | Edge devices provide data. |
| 9 | Prune | | | | The data is pruned in the mempool. |
| 9A | | | Append blok | | The pruned dataset is appended to the blok |
| 9B | | | Commit Hlekkr | | The revised blok is committed to the Hlekkr |
| 10 | Ask (action) | | | | Master can (possibly) ask edge device to execute another action. |
| 10A | | Provide (action) | | | Edge devices provide for the action requested by the master |
| 10B | | | Append blok | | The action is appended on the blok. |
| 10C | | | Commit Hlekkr | | The Blok is committed to updated the Hlekkr |
| 11 | Pass Hlekkr to new master | | | | When the objective context changes, the Hlekkr will pass the Hlekkr to the new master |
| 11A | Dismantle | | | | Dismantle allows the edge devices to regain individual control |
| 11B | | Reset | | | The edge devices log out of the mesh and are reset to function as individual masters |
| 11C | | | Encrypt | | The actions are encrypted using the partial inversion hash |
| 11D | | | | Lock | The Hlekkr is locked from any other action. This marks the end of operations |

Bootstrapping the New Master

Figure 4:
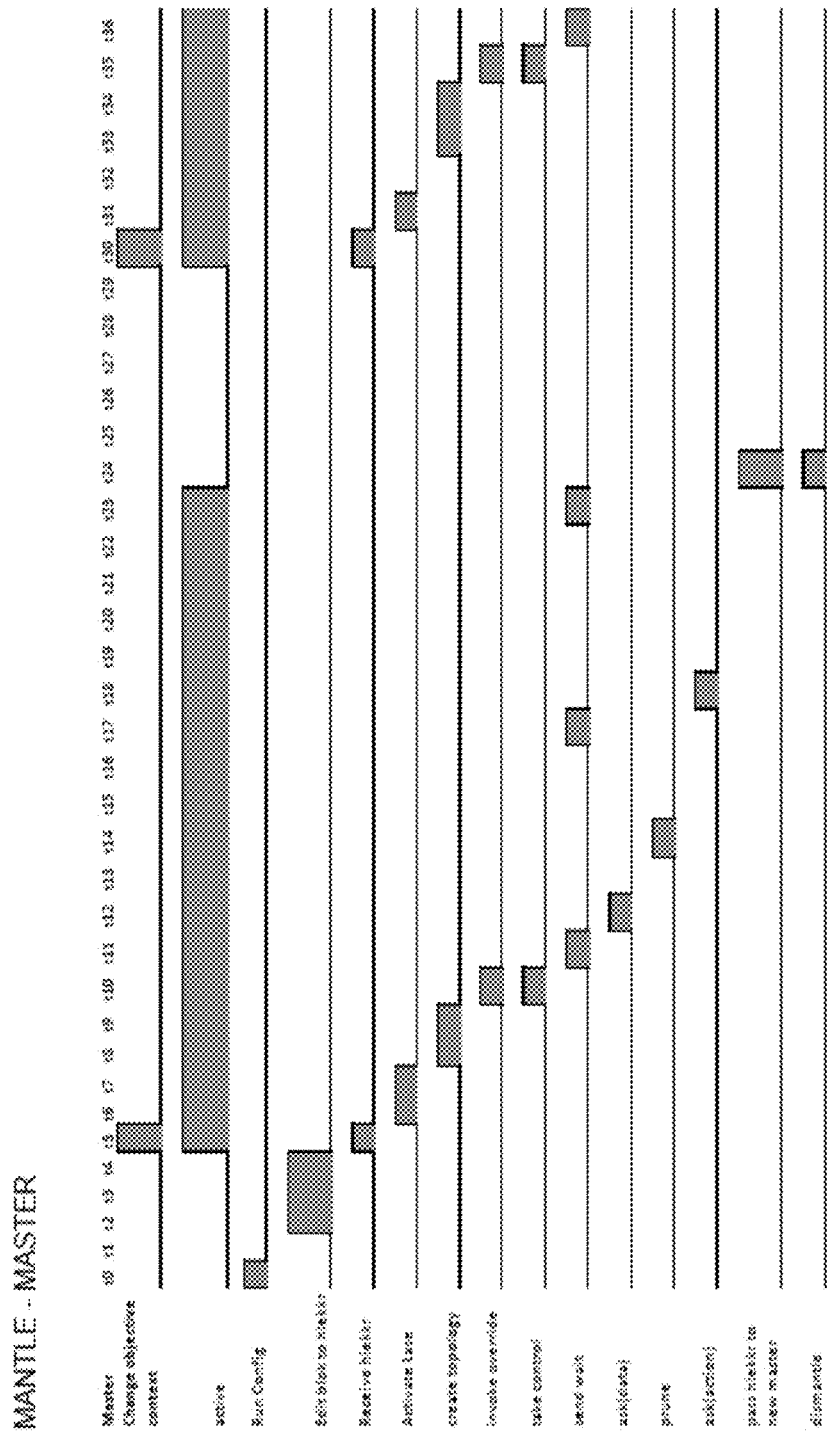
FIG. 4 is a first conceptual diagram of a non-limiting illustrative embodiments of mantles of the system when a new master connects to the network.
Figure 5:
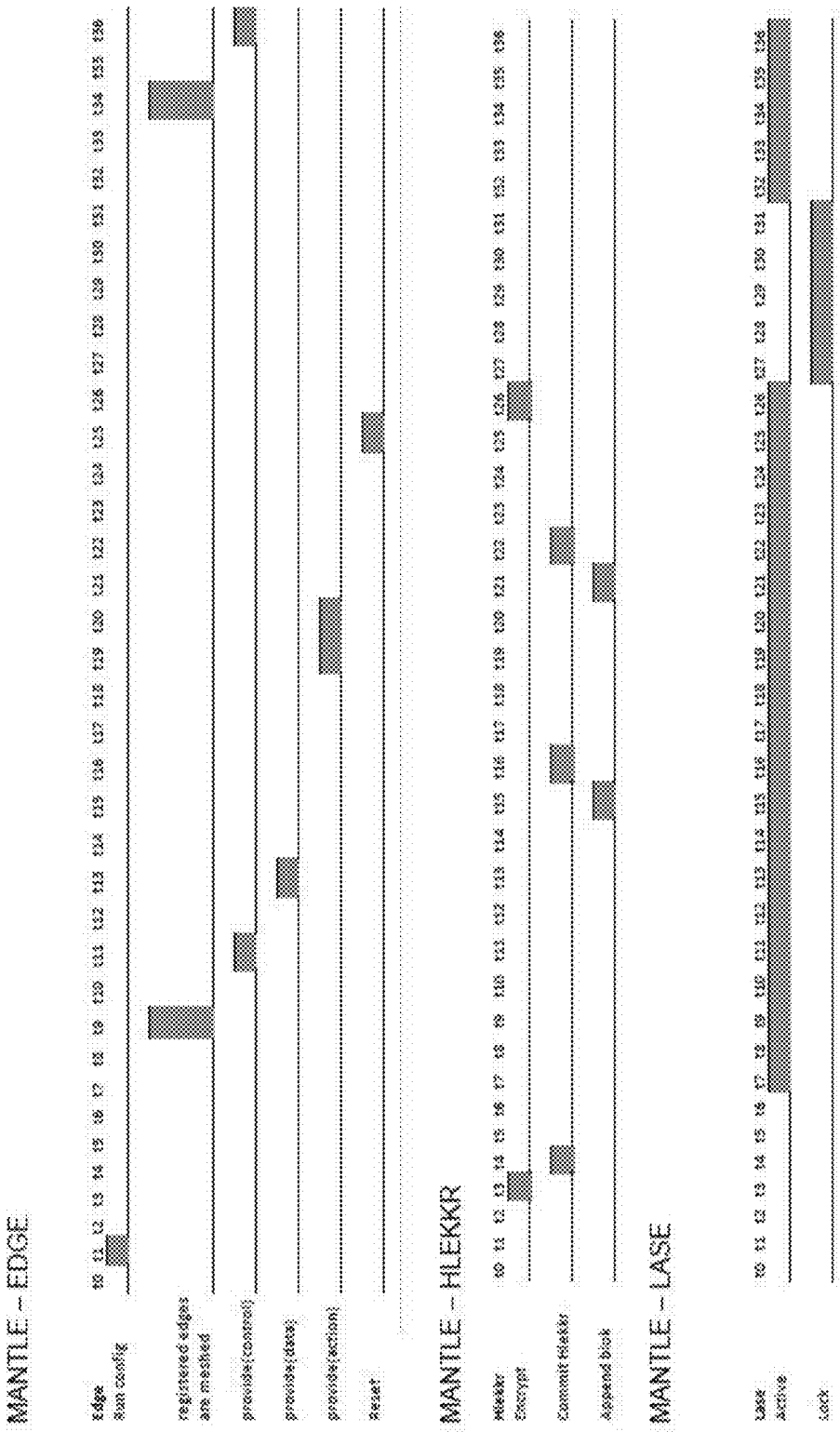
FIG. 5 is a second conceptual diagram of a non-limiting illustrative embodiments of mantles of the system when a new master connects to the network.

Referring now to FIGS. 4 and 5, there are shown conceptual diagrams of a non-limiting illustrative embodiments of mantles of the system when a new master connects to the network. When a master connects to the network for the first time, it requests a copy of the whole hlekkr, since the beginning. As a master downloads the bloks in the hlekkr, it checks the validity of the bloks. First, it checks that all the actions included in the blok are valid. Next, the master checks that the hash of the blok is well constructed and satisfies the required proof-of-work. By making these verifications, a new master cannot be fooled by a malicious master sending an invalid copy of the hlekkr. At the outset of the bootstrapping procedure, the master creates databases for the mempool. The databases are then updated with the information in each blok as the blok is processed.

Relay of Control

Some actions may award a considerable fee to the master. However, there are various factors incentivizing the master to relay the action. For example, edge devices usually connect to various masters when relaying a new action because it is in their interest that the action is relayed so that the action is included in the next blok committed or appended by the network. Additionally, masters connect to each other and can police whether a particular master is refraining from relaying actions. Also, a master that does not relay actions to other masters can be enlisted by a malicious master to help perform a duplicating attack.

Framework to Optimize Flash Crowd Scenario in DirMantle

To optimize the flash crowd scenario in dirMantle, the edge nodes are presumably harmonious and always capable of providing important information. In the flash crowd scenario, the most challenging phase for orchestration is where the majority of the edge devices are active as soon as the objective context is established.

The following sets, parameters and variables which help in developing the objectives subject to constraints.

Sets
  N: Set of edge devices and masters configured; in dirMantle
  $Nm_i$: Set of master i
  $S_w$: Set of stars
  $P_{h*}$: Set of peers in star k
  $Sd_k$: Set of edge (meshed) in star k
  $Pn_k$: Set of peers of star k located in master i Parameters:
  Nodes•: Number of edge devices
    Erp: Power consumption of an edge device
    Et: Power consumption of a master
    W: Number of wavelengths a fiber
    B: Bit rate of a wavelength
    S: Span distance between Edge device
    $D_{mn}$: Distance between master pair (m,n)
    $A_{mn}$: Number of edge devices between master (m,n)
    SN: Number of stars
    PN: of peers in a single star
    PN: Number of edge (meshed) in a single star
    LN: Number of edge (configured)s in a single star
    $Np_k$: The master of peer i that belongs to star k
    SLN: Number of upload slots, typically 4
    Up: Upload capacity for each peer
    SR: Upload rate far each slot, SR=Up/SLN
    Dp: Download capacity of each peer
    F: File size in kb
    $L^{sd}_i$: Regular traffic demand between master pair (s,d)

Variables
  $C_i$: Number of wavelengths in the edge link (i,j)
  $L^{sd}_k$: Traffic demand between master pair (s,d) in star k.
  $L^{sd}_i$: Star k traffic demand between master pair (s,d) traversing et e link (i,j)
  $L^{sd}_i$: The regular traffic flow between master pair (s,d) traversing edge link (i,j)
  $W^l_{mn}$: Number of wavelength channels in the edge link (i,j) that traverse edge link (m,n)
  $W_{mn}$: Total number of wavelengths in the edge link (m,n)
  $F_{mn}$: Total number of fibrillation links on the edge link (m,n)
  $Q_i$: Number of masters in star i
  $U_k$: $U_k=1$ if master i unchokes peer j in star k, otherwise $U_k=0$
  $AVdr_k$: Download rate of peer i that belongs to star k The total edge network power consumption is composed of the power consumption of the edge devices and the power consumption of the master. The power consumption of edge devices is calculated according to Equation (1) and the power consumption of the master is calculated according to Equation (2).

$$\sum_{i \in N} E_{rp} \cdot Q_i + E_{rp} \cdot \sum_{i \in N} \sum_{j \in N: i \neq j} C_{ij} \qquad \text{Eq(1)}$$

$$\sum_{m \in N} \sum_{n \in Nm_m} Et \cdot W_{mn} \qquad \text{Eq(2)}$$

Equation (3) gives the model when peers try to maximize their download rate within the minimum power consumption.

$$\alpha \cdot \left( \sum_{k \in Sw, i \in P_k} \sum_{i \in Sd_k} Avdr_{ik} \right) - \beta \cdot \left[ \sum_{i \in N} E_{rp} \cdot Q_i + E_{rp} \cdot \sum_{i \in N} \sum_{j \in N: i \neq j} C_{ij} \right] \qquad \text{Eq(3)}$$

Equation (4) calculates the transient traffic between edges due to dirMantle stars.

$$L^{sd}_k = \sum_{i \in Pn_{sk}} \sum_{j \in Pn_{sk}: j \notin Sd_k} SR \cdot U_{ijk} \qquad \text{Eq(4)}$$

$\forall k \in S_w, d \in N: s \neq d$

Equation (5) and Equation (6) are the flow conservations for stars traffic and regular traffic, respectively.

$$\sum_{j \in N: i \neq j} L^{sd}_{ijk} - \sum_{j \in N: i \neq j} L^{sd}_{jik} = \begin{cases} L^{sd}_{ijk} & \text{if } i = s \\ -L^{sd}_{ijk} & \text{if } i = d \\ 0 \end{cases} \qquad \text{Eq(5)}$$

$\forall k \in S_w, d \in N: s \neq d$ $$\sum_{j \in N: i \neq j} L^{sd}_{ij} - \sum_{j \in N: i \neq j} L^{sd}_{ji} = \begin{cases} L^{sd}_r & \text{if } i = s \\ -L^{sd}_r & \text{if } i = d \\ 0 \end{cases} \qquad \text{Eq(6)}$$

$\forall s, d, i \in N: s \neq d$

Equation (7) ensures that the traffic traversing an edge link does not exceed its capacity.

$$\sum_{s\in N}\sum_{d\in N:s\neq d}\left(L_{ij}^{sd}+\sum_{k\in Sw}L_{ijk}^{sd}\right)\leq C_{ij}\cdot B \qquad \text{Eq(7)}$$

$$\forall\, i,j\in N,:i\neq j$$

Equation (8) represents the flow conversation for the TCP operation.

$$\sum_{n\in Nm_m}W_{mn}^{ij}-\sum_{n\in Nm_m}W_{nm}^{ij}=\begin{cases}C_{ij} & \text{if } m=i \\ -C_{ij} & \text{if } m=i \\ 0 \end{cases} \qquad \text{Eq(8)}$$

$$\forall\, i,j,m\in N:i\neq j$$

Equation 9 ensures that the number of wavelength channels in edge links does not exceed the capacity of star master.

$$\sum_{i\in N}\sum_{j\in N:i\neq j}W_{mn}^{ij}\leq W\cdot F_{mn} \qquad \text{Eq(9)}$$

$$\forall\, m\in N\ \forall\, n\in Nm_m$$

Equation 10 ensures that the number of wavelength channels in edge links travelasel is equal to the number of wavelengths 'conversed' in that edge link.

$$\sum_{i\in N}\sum_{j\in N:i\neq j}W_{mn}^{ij}=W_{mn} \qquad \text{Eq(10)}$$

$$\forall\, m\in N\ \forall\, n\in Nm_m$$

Equation 11 limits the download rate of an edge configured to its download capacity.

$$Q_1=\frac{1}{B}\cdot\sum_{d\in N:i\neq d}\left(L_r^{id}+\sum_{k\in Sw}L_k^{id}\right) \qquad \text{Eq(11)}$$

$$\forall\, i\in N$$

$$Avdr_{ik}\leq Dp$$

$$\forall\, k\in S_w\forall\, i\in P_k:i\notin Sd_k$$

Equation 12 calculates the download rate for each peer according to the upload rate it receives from master selecting it.

$$Avdr_{ik}=\sum_{j\in P_k:i\neq j}SR \qquad \text{Eq(12)}$$

$$\forall\, k\in S_w\forall\, i\in P_k:i\notin Sd_k$$

Equation 13 gives the limit on the number of upload slots for each paper.

$$\sum_{j\in P_k:j\notin Sd_k,i\neq j}U_{ijk}\leq SLN \qquad \text{Eq(13)}$$

$$\forall\, k\in S_w\forall\, i\in P_k$$

Equation 14 represents fairness in DirMantle where each edge device reciprocates equally to other edge device communicating with master in star.

$$SR\cdot U_{ijk}=SR\cdot U_{jik}$$

$$\forall k\in S_w, \forall i\in P_k: i,j\notin Sd_k, i\neq j \qquad \text{Eq(14)}$$

LASE

The system comprises a public-key cryptography scheme based on the difficulty of factoring large integers. There are three main steps to LASE encryption: (1) key generation, (2) encryption, and (3) decryption. The key generation algorithm follows the steps:

1. Generate two large primes p and q.
2. Multiply the two primes n=p·q.
3. Compute Euler's Phi for a Euler's Phi is the number of integers in the cyclic group $\mathbb{Z}_n=\{1, 2, \ldots n-1\}$ which are prime to n. It is given by $\Phi(n)=(p-1)\cdot(q\cdot1)$
4. Select an exponent $e\in\{1,\ldots,\Phi(n)-1\}$ that is relatively prime to $\Phi(n)$. This exponent will be part of the public key.
5. Compute the private key d as the multiplicative inverse of e modulo $\Phi(n)$, that is: $d\cdot e=1 \bmod \Phi(n)$.

The public key is (n, e) and the private key is d. For encryption, the ciphertext of a message m is just m raised to the power of the public key e in modulo n arithmetic, as shown in Equation (15).

$$c=m^e \bmod n \qquad \text{Eq(15)}$$

For decrypt a ciphertext c, it is raised to the power of the private key d, also modulo n, as shown in Equation (16).

$$M=c^d \bmod n=m^{de} \bmod n \qquad \text{Eq(16)}$$

A long message m is a long string of zeros and ones, and can be interpreted as an integer. The number representing message m must be smaller than the order of the group n. To encrypt a long integer with LASE, n must be chosen to be greater than m. Therefore, although it is technically possible to encrypt long messages with LASE, private and public keys can be very big (of the order of magnitude of the message itself) and the computational cost can become very large.

In order to break LASE, an attacker must discover the unique prime factors of n. If an attacker were able to do so, she could run the key generation algorithm to derive d and subsequently easily decrypt the ciphertext. The security of LASE thus depends on the hardness of the factoring problem, whose complexity class is not known.

Hlekkr

Figure 6:
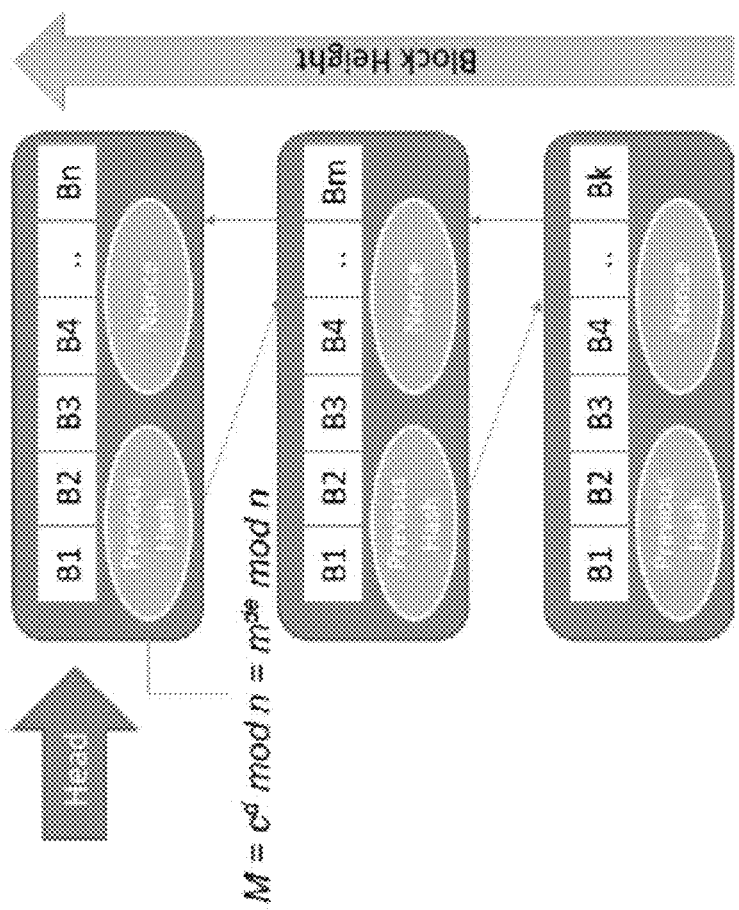
FIG. 6 is a conceptual diagram of a non-limiting illustrative embodiment of the hlekkr of the system.

Referring now to FIG. 6, there is shown a conceptual diagram of a non-limiting illustrative embodiment of the hlekkr of the system. The hlekkr keeps a secure list of all the actions. The hlekkr uses proof-of-work to secure the distributed database. This means the hlekkr is secured against tamper attempts by the computational power equivalent to all the computational power spent from that point in time to the present. Furthermore, the attacker would have to outrun the legitimate dirMantle network, which keeps adding entries to the distributed database. In other words, it would have to catch up, computationally speaking, with the legitimate network to change the information in the database. DirMantle combines the ideas behind linked time-stamping and Hashcash style proof-of-work to arrive at a way to secure the distributed database.

The hlekkr is an ever-growing chain of bloks. Each blok contains a group of new actions and a link to the previous blok in the chain. New actions in the network are collected into a blok, which is appended to the hlekkr. Old actions are still in the hlekkr. Thus, old bloks are never removed from the hlekkr and therefore, the hlekkr can only increase in length. Each blok is secured with a partial hash inversion proof-of-work, depicted in FIG. XX. Each blok includes a group of valid actions, the hash of the previous blok, and a nonce. The nonce in a blok solves the partial hash inversion problem. That is, the nonce is a number such that the has on the entire blok, including the nonce, starts with a certain number of zero bits.

Blok Difficulty

It is easy to adjust the blok difficulty by increasing the number of starting zero bits. The dirMantle protocol adjusts this difficulty to target n time-units between bloks. This difficulty adjustment is part of the machine logic based rules of DirMantle and it is coded into every DirMantle edge device. The partial hash inversion problem can be understood as finding a nonce such that the resulting hash is lower than a target hash. The target has is a 256-bit number that starts with several zero bits. Internally the DirMantle master compresses this 256-bit number into a 32-bit unsigned integer, named bits. As each blok saves a copy of the bits integer, this compression saves considerable space in the hlekkr.

The hash rate of a master is the computational power, measured in hashes per second. The network hash rate is the total hash rate of all the masters in the network. The blok preceding a given blok is called its parent blok. Bloks reference their parent blok in the Hlekkr by including its hash in their data structure. Thus, the hlekkr keeps bloks in chronological order. The first blok in the hlekkr is termed the origin blok. The order of a blok in the hlekkr, starting from the origin blokk, is the blok height. Finally, the last blok added to the hlekkr is termed the "hlekkr head." New bloks are added on top of the hlekkr head. Actions included in the bloks of a fork are not lost. When a for is resolved and a hlekkr length is measured by the combined difficulty of all the bloks in the chain.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A system for optimizing edge side dynamic response with context propagation for Internet of Things (IoT), comprising:
   one or more devices, each connected to a first master in an IoT star topology network;
   wherein the first master is configured to receive a copy of a distributed database, comprising one or more actions from a second master, and to confirm the one or more actions, resulting in one or more confirmed actions;
   one or more bloks, each blok configured for storing one or more confirmed actions;
   wherein the first master is adapted to validate the one or more bloks using hash functions; and
   wherein the first master is adapted to transmit the one or more bloks to the second master and to update the distributed database and a memory database with activity information contained within one or more bloks.

2. The system of claim 1, further comprising a database storing unconfirmed actions.

3. The system of claim 2, wherein the public-key cryptography scheme is based on difficulty of factoring large integers.

4. The system of claim 1, wherein contents of an action is secured through a public-key cryptography scheme.

5. The system of claim 1, wherein the distributed database comprises a secure list of all actions.

6. The system of claim 5, wherein the bloks are stored in the distributed database in chronological order.

7. A method for providing a dynamic one-the-edge heterogeneous Internet of Things (IoT) network, comprising:
   providing a network with one or more systems, each system having one or more devices, each connected to a master in an IoT star topology network;
   receiving a copy of a distributed database comprising actions at a first master of a first system;
   validating, by the first master of the first system, the distributed database using hash functions;
   receiving a blok, storing one or more confirmed actions, at the first master of the first system;
   validating the blok by requiring the blok solve a partial hash inversion problem;
   updating the distributed database and a memory database with activity information contained within the blok; and
   transmitting the blok to a second master of a second system.

8. The method of claim 7, further comprising the step of: storing the blok in the distributed database.

9. The method of claim 7, further comprising the steps of:
   receiving an action at the first master;
   relaying the action to the blok; and
   securing contents of the action through a public-key cryptography scheme.

10. The method of claim 9, wherein the public-key cryptography scheme is based on the difficulty of factoring large integers.

11. The method of claim 7, further comprising the steps of:
   receiving a first action at the first master;
   transmitting the first action to a memory database; and
   receiving a second action at the first master; and
   determining if the second action is a duplicate of the first action stored in the memory database.

12. A computer program product providing content on multiple virtual displays, the computer program comprising a computer readable storage medium having program instructions embodied therewith, wherein the computer readable storage medium is not a transitory signal per se, the program instructions are readable by a computer to cause the computer to perform a method comprising the steps of:
   providing a network with a first system having one or more devices connected to a first master in an Internet-of-Things (IoT) star topology network;
   adding a second system having one or more devices connected to a second master in an IoT star topology network;
   receiving, by the second master, a copy of a distributed database comprising actions from the first master;

validating, by the second master, the distributed database using hash functions;

transmitting a blok from the first master to the second master;

validating, by the second master, the blok using hash functions; and updating the distributed database and a memory database with activity information contained within the blok.

13. The computer program product of claim 12, further comprising the step of securing the blok through a public-key cryptography scheme based on the difficulty of factoring large integers.

14. The computer program product of claim 12, further comprising the step of propogating the blok in the network.

15. The computer program product of claim 12, wherein the actions are included in bloks.

16. The computer program product of claim 15, wherein the bloks are stored in the distributed database in chronological order.

17. The computer program product of claim 12, further comprising the steps of:

receiving a new action at the second master; and determining if the new action is a duplicate of an activity information contained in the memory database.

18. The computer program product of claim 17, further comprising the step of including the new action in a blok.

19. The computer program product of claim 17, further comprising the step of notifying the one or more devices when an action is included in a blok.

20. The computer program product of claim 12; further comprising the steps of:

receiving a new action from the one or more devices; and relaying the new action created by the one or more devices to the network.

* * * * *